United States Patent [19]

Eldridge et al.

[11] Patent Number: 4,953,174
[45] Date of Patent: Aug. 28, 1990

[54] PREIONIZATION ELECTRODE FOR PULSED GAS LASER

[75] Inventors: Robert E. Eldridge, Los Angeles; David B. Cohn, Torrance; Wayde H. Affleck, El Segundo, all of Calif.

[73] Assignee: Hughes Aircraft Company, Los Angeles, Calif.

[21] Appl. No.: 425,264

[22] Filed: Oct. 23, 1989

[51] Int. Cl.$^5$ .......................................... H01S 3/097
[52] U.S. Cl. ....................................... 372/87; 372/86; 372/83; 372/61; 372/55
[58] Field of Search ............... 372/59, 81, 86, 87, 372/83, 61, 55; 313/231.71, 231.41, 574, 631; 361/230, 212

[56] References Cited

U.S. PATENT DOCUMENTS

| | | | |
|---|---|---|---|
| 4,464,760 | 7/1982 | Sutter, Jr. | 372/61 |
| 4,620,306 | 10/1986 | Sutter, Jr. | 372/61 |
| 4,677,638 | 6/1987 | Beaupere et al. | 372/83 |

Primary Examiner—Frank Gonzalez
Assistant Examiner—Susan S. Morse
Attorney, Agent, or Firm—William J. Streeter; Wanda K. Denson-Low

[57] ABSTRACT

A laser preionization electrode (15, 17) formed of a dielectric tube (16) of square cross-section enclosing an electrode (18) of circular cross-section, the electrode (18) being of a large diameter on the order of 6.35 millimeters. A pair of such electrodes (15, 17) are located on either side of a main electrode (11) in a laser with the result that longer length preionization electrodes may be constructed while eliminating alignment problems of the prior art.

13 Claims, 1 Drawing Sheet

PREIONIZATION ELECTRODE FOR PULSED GAS LASER

BACKGROUND OF THE INVENTION

1. Field of the Invention

The subject invention relates generally to lasers and, more particularly, to improved preionization apparatus for pulsed gas lasers.

2. Description of Related Art $CO_2$ transversely excited atmospheric (TEA) lasers are important components in various range finders, designators, and pulsed radar systems. Reliable designs for such lasers are essential. The discharge preionizer is a central component of such lasers and is a major determinant of overall cost.

High pressure lasers such as the $CO_2$ type generally employ a gain medium, defined by an opposed rectangular anode and cathode of large aspect ratio The gain medium is excited by pulsed discharges, the pulses being on the order of 100 nanoseconds or less in duration. In order to achieve a uniform discharge throughout the gain medium, uniform preionization is required. The accepted means of achieving uniform preionization in compact tactical lasers is through use of auxiliary corona discharge. The corona discharge creates ultraviolet (uv) radiation which ionizes the gain medium.

In the prior art, corona discharges have been obtained by placing a third grounded and insulated auxiliary electrode adjacent the pulsed main discharge electrode. The auxiliary electrode typically has employed ceramic insulation, which serves as a distributed capacitance. Accordingly, the corona strength is proportional to the power required to charge this distributed capacitance. To achieve a large capacitance and, hence, a strong corona discharge, it is important to have high dielectric field strengths and intimate contact between the ceramic auxiliary electrode and the main electrode.

In order to achieve high dielectric field strength, prior preionizers have used small diameter ($\approx 1.6$ mm) rods encased in small bore ceramic tubes. These designs, however, are fragile and cannot be made longer than about 15 centimeters (cm). Most importantly, because of lack of structural rigidity, alignment with the main electrode is very difficult to achieve. Approaches using sharp edged electrodes are not producible and are prone to dielectric breakdown because of intense fields.

In one alternative prior art design, the trigger preionization electrode has been configured as a blade inserted into a slot in the encapsulating dielectric. This approach is prohibitively expensive and difficult to produce.

Thus, prior art preionizer approaches have suffered from (1) difficulties in obtaining the required critical intimate contact between the preionizer insulator and main electrode, (2) high production costs, (3) the relatively short electrode lengths that can be machined with the required tolerances, and (4) high voltage breakdown of the insulator.

SUMMARY OF THE INVENTION

Accordingly, it is an object of the invention to improve lasers;

It is another object of the invention to improve corona discharge apparatus used in lasers;

It is another object of the invention to improve preionizer electrode apparatus used in pulsed gas lasers;

It is another object of the invention to provide a preionizer design which eliminates difficulties in obtaining required intimate contact between the preionizer insulator and the main electrode;

It is another object of the invention to provide a more economical preionizer design; and It is yet another object of the invention to provide such a preionizer which is resistant to high voltage breakdown.

These and other objects and advantages are achieved according to the invention by the provision of an insulator tube or conduit enclosing a large diameter (e.g., 6.35 mm) preionizer electrode. The large cross-section preionizer provides the required level of preionizing radiation, while eliminating the strength and alignment problems of the prior art.

BRIEF DESCRIPTION OF THE DRAWINGS

The just-summarized invention will now be described in detail in conjunction with the drawings, of which.

DETAILED DESCRIPTION OF THE PREFERRED EMBODIMENTS

Preionization of high pressure $CO_2$ laser discharges can be achieved by a variety of means. However, with respect to compact and rugged devices, the corona discharge approach is most desirable. The basic geometry of prior art corona discharge assemblies has consisted of a small diameter bar electrode encased in an insulator and placed adjacent to the high voltage pulsed main discharge electrode. The trigger and main electrodes act as the plates of a capacitor and the dielectric is the capacitance medium. Upon application of a high voltage pulse at the main electrode, the intense electric field causes gas breakdown on and near the insulator surface with the liberation of ultraviolet (uv) photons. The uv photons penetrate the main discharge volume and uniformly ionizes the gas there at a low level. The main discharge immediately follows.

In prior work, the trigger electrode has taken the form of a small diameter rod, and the dielectric has been a small diameter ceramic tube. By virtue of the short lengths of ceramic tube available, this approach is limited to short gain length (about 15 cm) lasers. Further, the tube must be held firmly against the main electrode, which is very difficult to achieve in a high field stress, compact geometry. Finally, this prior art design enhances capacitive displacement current by increasing dielectric field strength and, at the required operating conditions, dielectric breakdown is often encountered.

Figure 1:
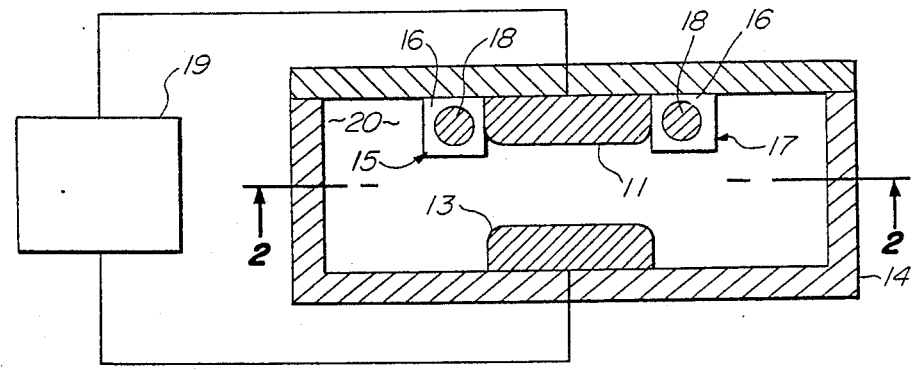
FIG. 1 is a cross-sectional view of a laser including an electrode assembly according to the preferred embodiment.
Figure 2:
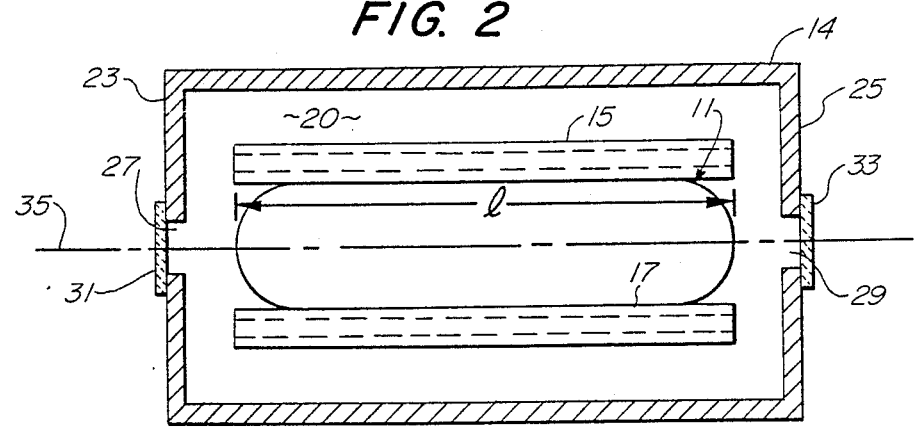
FIG. 2 is a longitudinal view taken along 2—2 of FIG. 1.

A cross-sectional view of a TEA laser employing a corona discharge assembly which improves over such prior art is shown in FIG. 1. This laser includes a main discharge anode 11 and a main discharge cathode 13 disposed on respective top and bottom surfaces of a laser housing 14. The anode 11 and cathode 13 are conventional metallic elements bonded or otherwise secured to the housing 14. As indicated by FIG. 2, the anode 11 and cathode 13 are disposed between the longitudinal ends 23, 25 of the laser, each of which includes a respective aperture 27, 29 for attaching optical reflector mounts 31, 33 lying on a central axis 35.

Preionizer apparatus, including first and second preionizer electrodes 15, 17, is located on either side of the anode 11. The preionizer electrodes 15, 17 are grounded by connection through a wire to the cathode 11 (ground).

A high voltage pulse is applied to the anode 11 from a high voltage pulse source 19 connected to the anode 11 and the cathode 13. This pulse supplies the small amount of energy needed to activate the precursor preionization discharge and the energy to pump the lasing medium 20 between the main electrodes 11, 13.

In one embodiment, the width of the cross-section of the main electrodes 15, 17 shown in FIG. 1 is 3 cm and the length l (FIG. 2) is 30 cm, respectively. The anode-cathode separation is 1.5 cm. The preionizer electrodes 15, 17 each comprise a square ceramic tube 16, for example, of alumina, machinable glass, ceramic, mica, or other suitable dielectric. Each ceramic tube 16 contains a conductive metal rod 18, fabricated, for example, of copper or another suitable conductor. The width of the ceramic tubes "w" in a preferred embodiment is 1.2 cm, while the diameter of the rod 18 is 0.635 cm.

The conductive rod 18 may be slip fitted into the ceramic tube and fastened by screws or other conventional means. The ceramic tubes 16 are positioned adjacent the anode 11 by fastening to the wall of the housing 10, again using conventional mechanical connections or adhesive means. Metallization may alternatively be applied to the interior of each tube 16 to form the desired electrode.

Figure 3:
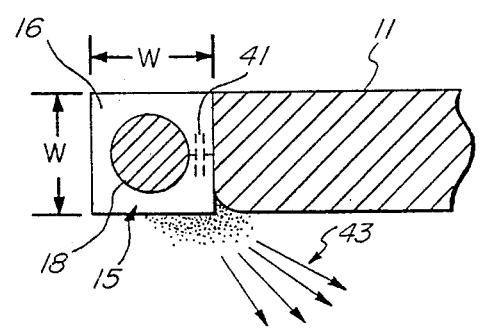
FIG. 3 is an enlarged view of a portion of the electrode assembly shown in cross-section in FIG. 1.

FIG. 3 shows an enlarged view of the preionizer 15 and the anode 11 and illustrates the salient points of the preionization process. In the presence of a high voltage field between the preionizer metal rod electrode 18 and the surface of the anode 11, a surface discharge takes place which emits uv photons 43. These photons 43 preionize the main discharge and allow a uniform glow discharge to develop.

It is important to have a generous supply of uv photons 43. The supply depends upon the strength of the surface discharge. The surface discharge continues until the distributed capacitance 41 in the dielectric ceramic 16 is fully charged. Hence, the larger the capacitance, the greater the discharge. To ensure a large capacitance, it is desirable to have a thin dielectric wall between the rod 18 and the anode 11 and to have a large area of contact between the preionizer electrode 15 and the anode 11. In the preferred embodiment, these goals are achieved using a large, square ceramic tube 16 and a large diameter inner electrode 18. The range of the tube width "w" and the range of the inner electrode diameter are about ½ to 1½ cm and 0.3 to 0.9 cm, respectively. This is the approximate range in which the dimensions may be varied and still achieve the advantages of the invention in providing a rigid, easily aligned structure which can be fabricated in long lengths, while avoiding high voltage breakdown of the dielectric. Any particular design will appropriately match the diameter of the rod 18 with the width "w" of the square ceramic tube 16 to achieve appropriate capacitance.

In operation, several preionizers of the type disclosed have operated without fail for multimillion shots at a 200-Hz repetition rate. Voltages have been on the order of 25 kilovolts, and the total stored energy has been 6 Joules per pulse. A laser with the dimensions described above has shown long life operation with an output energy per pulse of 350 milliJoules. The preionizers 15, 17 have been shown to be simple to align with the main electrode 11 and to incorporate into an inexpensive, robust assembly. The difficulty in alignment which seriously compromises performance of prior art preionizers has been eliminated.

As has been discussed, prior art preionizers typically required a circular cross-section tube, which is the only type that can be made in small diameters with the required tolerances, whereas the preferred embodiment employs a square tube approach. The increased surface area achieved with the flat wall of the square tube (as opposed to the line contact with a circular tube of the prior art) appears to provide the required distributed capacitance, while reducing field stress in the dielectric through use of a large diameter preionizer rod electrode.

As has been previously mentioned, prior art devices achieved a large capacitance by use of much smaller cross-sections; but in such case, rigidity was lost, high voltage breakdown of the dielectric was often encountered, and only short electrodes could be fabricated. The preferred embodiment solves these problems by the use of a robust ceramic and tube assembly that has been made 30 cm long and avoids the issues of high field strength and ceramic breakdown. In addition, the preferred embodiment is producible and can be fabricated separately from the rest of the electrode structure. Finally, the preferred embodiment can accommodate both polarities of discharge in that it can be placed at either main electrode 11, 13.

Those skilled in the art will appreciate that the just-disclosed preferred embodiment is subject to numerous adaptations and modifications without departing from the scope and spirit of the invention. Therefore, it is to be understood that, within the scope of the appended claims, the invention may be practiced other than as specifically described herein.

What is claimed is:

1. Laser preionizer apparatus comprising:
    a dielectric tube of rectangular cross-section; and
    an electrode of circular cross-section disposed within said tube and having a diameter in the range of 3 to 9 millimeters.

2. The preionizer apparatus of claim 1 wherein said electrode comprises a metal rod.

3. The preionizer of claim 2 wherein said metal rod slip fits into said tube.

4. The preionizer apparatus of claim 1 wherein said electrode comprises metallization deposited within said tube.

5. The preionizer apparatus of claim 2 wherein the diameter of said metal rod is 6.35 millimeters.

6. The preionizer apparatus of claim 5 wherein said dielectric tube comprises a ceramic material.

7. The preionizer apparatus of claim 2 wherein said dielectric tube is square in cross-section.

8. The preionizer apparatus of claim 7 wherein said dielectric tube is on the order of 12 millimeters square.

9. A laser comprising:
    a housing having first and second opposing sides;
    first and second main electrodes mounted respectively on said first and second opposing sides; and
    first and second preionization electrodes mounted on either side of one of said first and second main electrodes, said first and second preionization electrodes each comprising a rectangular dielectric tube surrounding a conductive electrode of circular cross-section.

10. The laser of claim 9 wherein said rectangular tube comprises a square tube.

11. The laser of claim 10 wherein said tube is on the order of 12 millimeters square.

12. The laser of claim 10 wherein said conductive electrode is in the range of 3 to 9 millimeters in diameter.

13. The laser of claim 9 wherein said conductive tube is substantially 6.35 millimeters in diameter.

* * * * *